United States Patent
Wu et al.

(10) Patent No.: US 7,388,626 B2
(45) Date of Patent: Jun. 17, 2008

(54) LIQUID CRYSTAL DISPLAY PANEL HAVING A CELL TEST STRUCTURE COMPRISING BOUNDING PADS CONNECTING SHORTING BARS TO FLEXIBLE PRINTED CIRCUIT AND DRIVING IC

(75) Inventors: Hsin-Tai Wu, Chang-Hua Hsien (TW); Chao-Liang Lu, Taoyuan (TW); Chih-Hsiang Yang, Tao-Yuan Hsien (TW); Kuo-Chih Lee, Tainan County (TW)

(73) Assignee: AU Optronics Corp., Hsin-Chu (TW)

( * ) Notice: Subject to any disclaimer, the term of this patent is extended or adjusted under 35 U.S.C. 154(b) by 659 days.

(21) Appl. No.: 10/710,932

(22) Filed: Aug. 13, 2004

(65) Prior Publication Data
US 2005/0264503 A1 Dec. 1, 2005

(30) Foreign Application Priority Data
Jun. 1, 2004 (TW) .............................. 93115674 A

(51) Int. Cl.
*G02F 1/1333* (2006.01)
(52) U.S. Cl. .................. 349/54; 349/192; 349/150; 349/151; 345/87; 345/93

(58) Field of Classification Search ........ 349/149–152, 349/192, 40, 54; 345/87, 93
See application file for complete search history.

(56) References Cited

U.S. PATENT DOCUMENTS

| 6,025,891 | A | 2/2000 | Kim |
| 6,392,719 | B2 | 5/2002 | Kim |
| 7,129,998 | B2 * | 10/2006 | Ohgiichi et al. .............. 349/40 |

* cited by examiner

*Primary Examiner*—Thoi V Duong
(74) *Attorney, Agent, or Firm*—Winston Hsu

(57) ABSTRACT

The present invention relates to a liquid crystal display panel having a cell test structure and a method for making the same. The liquid crystal display panel includes a substrate having a plurality of first driving IC mounting areas, a plurality of first conductive wires located on the substrate, a plurality of second conductive wires that are parallel and interlaced with the first conductive wires, a first shorting bar connected to the first conductive wires and passing through all of the first driving IC mounting areas, and a second shorting bar connected to the second conductive wires and passing through all of the first driving IC mounting areas.

13 Claims, 7 Drawing Sheets

LIQUID CRYSTAL DISPLAY PANEL HAVING A CELL TEST STRUCTURE COMPRISING BOUNDING PADS CONNECTING SHORTING BARS TO FLEXIBLE PRINTED CIRCUIT AND DRIVING IC

BACKGROUND OF INVENTION

1. Field of the Invention

The present invention generally relates to a liquid crystal display and a method of producing the same, and more particularly, to a method for the liquid crystal display having this structure to more conveniently perform a cell test.

2. Description of the Prior Art

Thin film transistor liquid crystal displays are made up of array-arranged thin film transistors, suitable capacitors, bounding pads and other electrical devices to drive dot pixels and further produce rich and colorful images. Since thin film transistor liquid crystal displays have the advantages of having a small volume, having low power consumption, and being radiation free, they have been widely applied to laptops, PCs and personal digital portable information products, and have tended to replace the traditional CRT monitors of desktop PCs.

Please refer to FIG. 1 and FIG. 2. FIG. 1 is a schematic diagram of a liquid crystal display. FIG. 2 is the internal schematic diagram of a data line driving IC mounting area in FIG. 1. As shown in FIG. 1, a liquid crystal display 10 comprises a bottom substrate 12 and a top substrate 14 positioned on top of the bottom substrate 12. A liquid crystal molecular layer (not shown) is filled between the top substrate 14 and the bottom substrate 12, wherein the top substrate is indicated by a dotted line to prevent confusion. Additionally, the liquid crystal display 10 includes a plurality of scanning lines 16 and data lines 18, each scanning line 16 and data line 18 is positioned on the bottom substrate 12, and each scanning line is perpendicular to each data line 18. On the other hand, the top substrate 14 is a color filter for displaying the color images of the liquid crystal display 10.

In addition, as FIG. 1 shows, the bottom substrate 12 includes at least one scanning line driving IC mounting area 20 for installing a scanning driving IC (not shown), and a plurality of data line driving IC mounting areas 22 for installing data driving ICs (not shown), wherein the scanning line driving ICs output a clock signal to each scanning line 16, and each data line driving IC output image information to each data line 18. Furthermore, as FIG. 2 shows, each data line driving IC mounting area 22 includes a shorting bar 24 and a plurality of bounding pads 26, wherein each data line 18 at the data line driving IC mounting area connects to the shorting bar 24, and each bounding pad 26 is for bounding each bump of data line driving IC on. Moreover, since the internal structure of the scanning line driving IC mounting area 20 is similar to each data line driving IC mounting area 22, the structure description is omitted.

In general, before each data line driving IC and each scanning line driving IC are bounded on each data line driving IC mounting area 22 and scanning line driving IC mounting area 20, a cell test of a liquid crystal display 10 is performed in order to check in advance whether any abnormal color image exists. When the liquid crystal cell text is completed, a laser is utilized to cut off the connection between shorting bar 24 and each data line 18, followed by bounding each data line driving IC on each data line driving IC mounting area 22, and bounding the scanning line driving IC on the scanning line driving IC mounting area 20.

Moreover, in the aforementioned cell test, the shorting bar 24 is utilized for inputting a test signal to each data line 18, followed by checking the color image of the LCD 10 artificially. The shorting bar 24 has to connect to a test pad to receive the test signal. Therefore the signal can pass through the test pad to the shorting bar 24. However, as FIG. 2 shows, each bounding pad 26 occupies most of the space of the data line driving IC mounting area 22, therefore there is not enough space for installing a test pad for shorting bar 24 at the data line driving IC mounting area. Besides, even though the test pad is installed outside of the data line driving IC mounting area 22, the shorting bar 24 cannot be extended to the outside of data line driving IC mounting area 22 due to the short distance d between two neighboring bounding pads 26.

Consequently, please refer to FIG. 3. FIG. 3 is a schematic diagram of the cell test according to prior art. As FIG. 3 shows, the prior cell test generally attaches a conductive elastic 28 to the surface of each shorting bar 24. Thereafter a test signal is input to the conductive elastic 28, and the test signal passes through the shorting bar 24 to each data line 18. However, accordingly, the cell test inputs the same signals to each data line 18. Hence the red dot pixels, green dot pixels and blue dot pixels cannot be tested individually. Therefore, some defects cannot be found and the operators are not able to gain the complete defect information.

SUMMARY OF INVENTION

It is therefore a primary objective of the claimed invention to provide a liquid crystal display for performing a convenient cell test.

Another primary objective of the invention is to provide a method for producing a liquid crystal display to solve the aforementioned problem.

In accordance with the first objective of the invention, this invention provides a liquid crystal display comprising a first substrate, a plurality of first and second conductive wires in parallel and interlaced on the first substrate, a first shorting bar connected to the first conductive wires and a second shorting bar connected to the second conductive wires. Additionally, the first surface of the substrate includes a plurality of a plurality of first diving IC mounting areas for installing the first driving ICs separately. The first conductive wires and the second conductive wires are for receiving the signals from the first driving ICs, and the first and the second shorting bars pass through the first driving IC mounting areas.

The invention may best be understood by reference to the following description of an illustrative embodiment. Firstly, a first substrate and a second substrate are prepared, the first substrate comprising a plurality of first conductive wires and a plurality of first shorting bars connected to the first conductive wires. After the first shorting bars are utilized to perform the cell test, a cutting process is carried out to disconnect to connection between the first shorting bars and the first conductive wires. Thereafter, a plurality of first driving ICs is bounded on the first substrate and the shorting bars are connected to the first driving ICs in series, wherein the first driving IC is for outputting signals to the first conductive wires.

In the claimed invention, the shorting bars have the advantages of performing a cell test and connecting to the driving ICs in series so that the invention can reduce the number of conductive wires and reach the efficacy of saving space.

DETAILED DESCRIPTION

Figure 1:
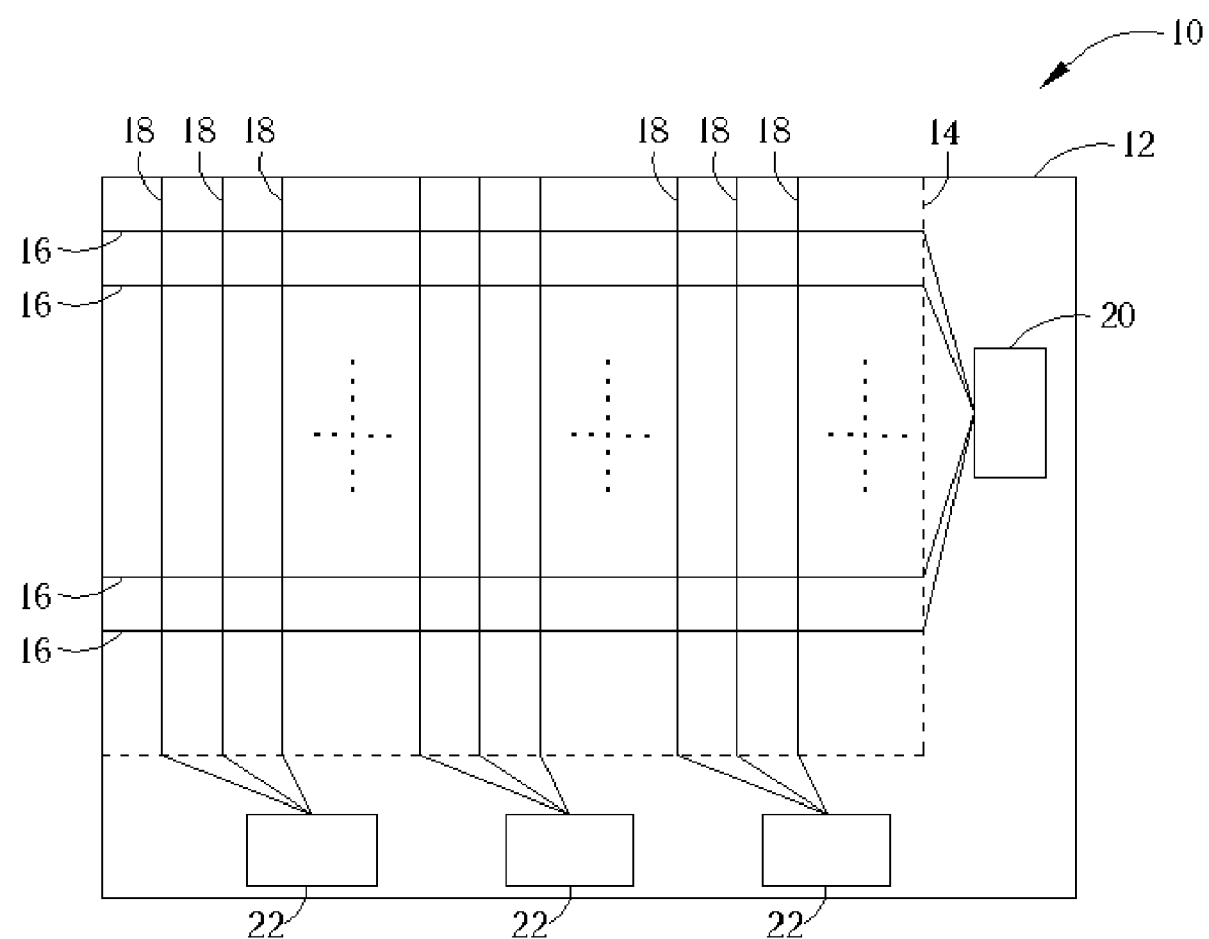
FIG. 1 is a schematic diagram of a liquid crystal display.
Figure 2:
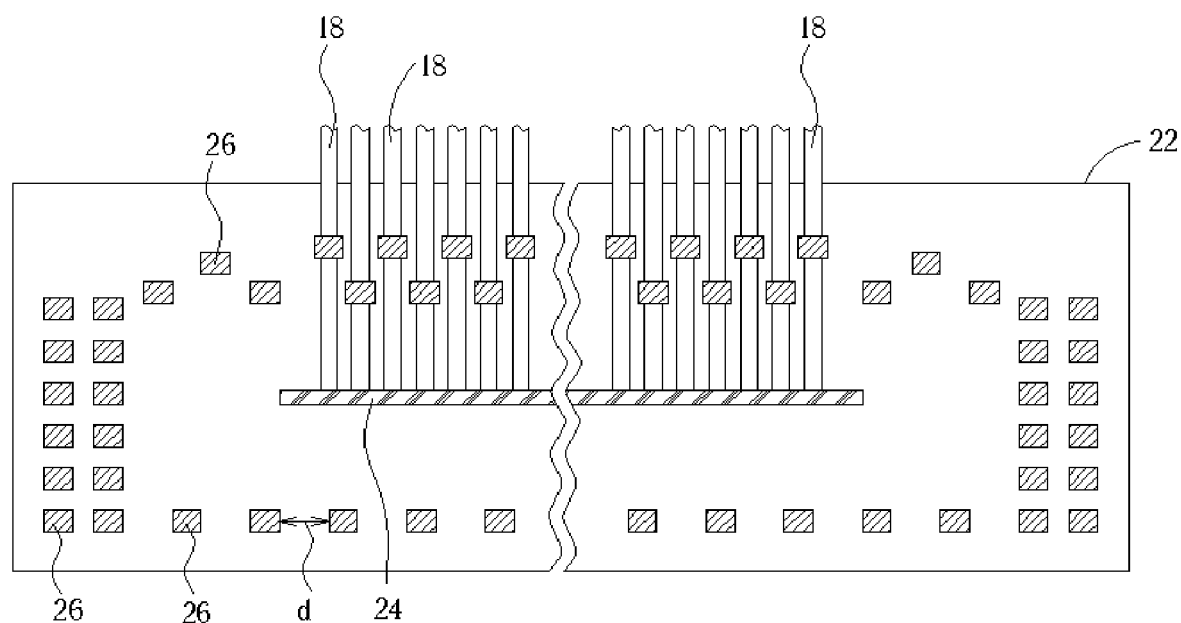
FIG. 2 is an internal schematic diagram of a data line driving IC mounting area.
Figure 3:
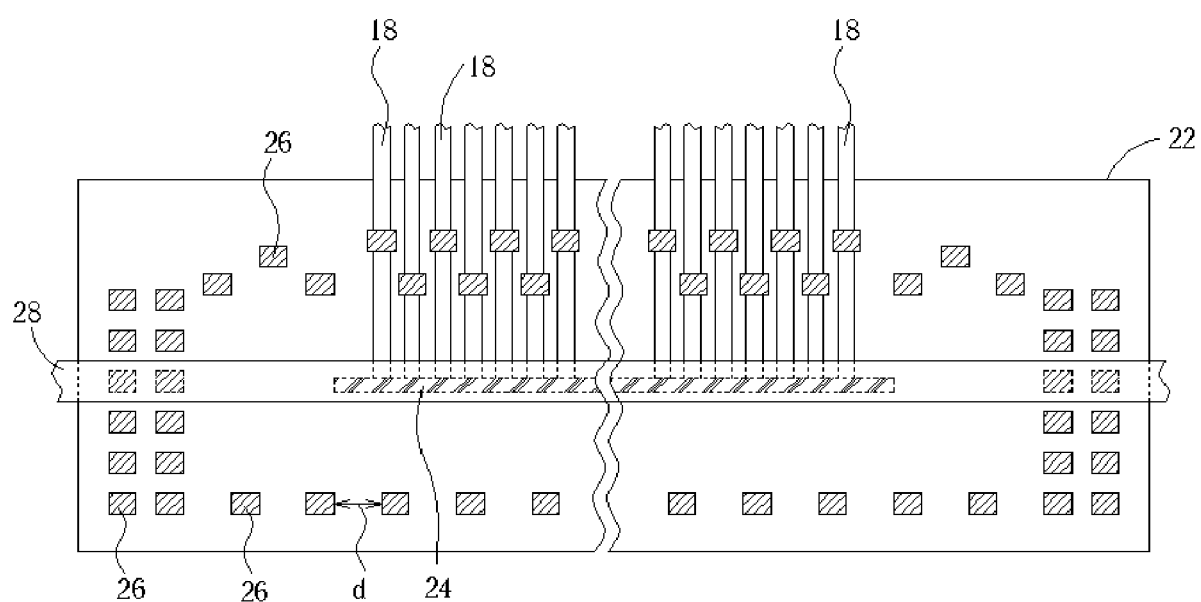
FIG. 3 is a schematic diagram of a cell test of the prior art.
Figure 4:
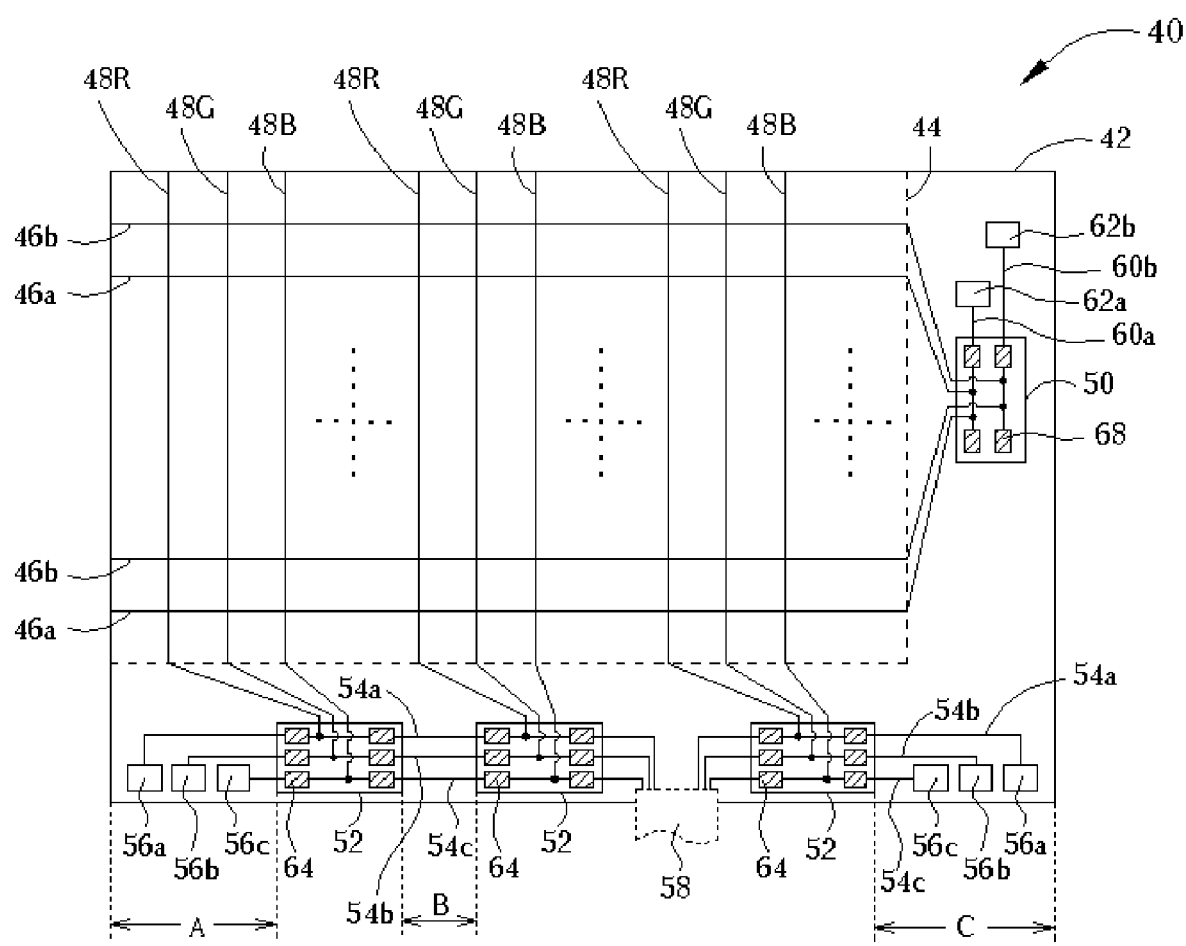
FIG. 4 is a schematic diagram of the first embodiment of the present invention liquid crystal display.
Figure 5:
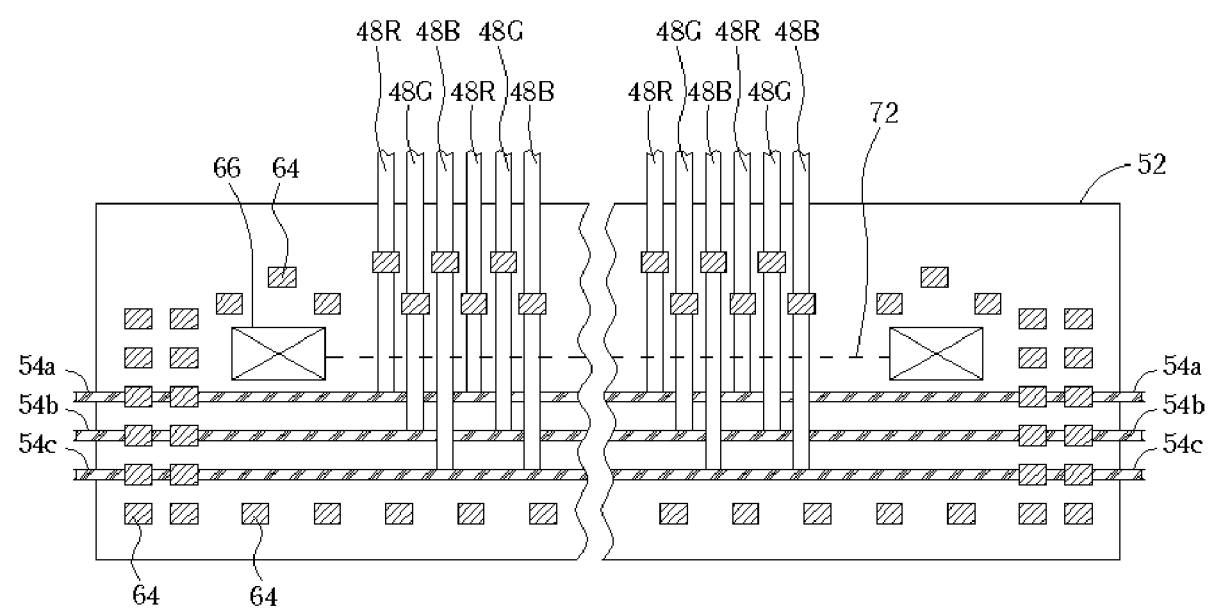
FIG. 5 is an internal schematic diagram of the data line driving IC mounting area in FIG. 4.
Figure 6:
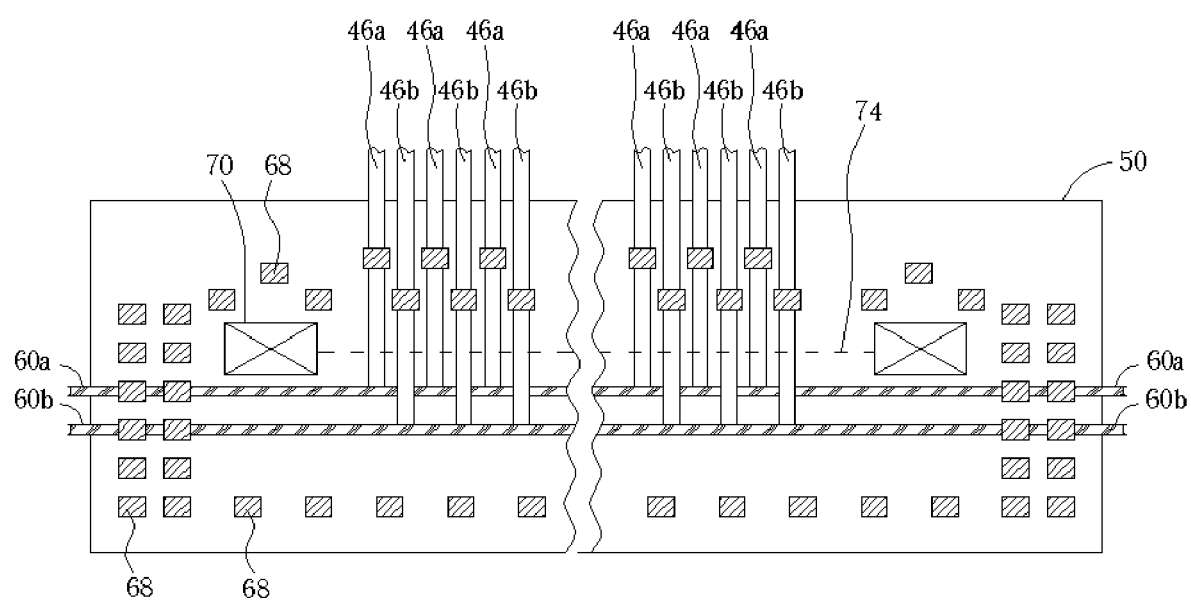
FIG. 6 is an internal schematic diagram of the scanning line driving IC mounting area in FIG. 4.

Please refer to FIG. 4 to FIG. 6. FIG. 4 is a first embodiment of the present invention liquid crystal display. FIG. 5 is an internal schematic diagram of a data line driving IC mounting area shown in FIG. 4. FIG. 6 is an internal schematic diagram of the scanning line driving IC mounting area in FIG. 4.

As shown in FIG. 4, a liquid crystal display 40 comprises a bottom substrate 42 and a top substrate 44 positioned on the bottom substrate. A liquid crystal molecular layer (not shown) is filled between the top substrate 44 and the bottom substrate 42, wherein the top substrate 44 is shown by dotted lines to avoid confusion. Additionally, the liquid crystal display 40 includes a plurality of scanning lines 46a formed in parallel with or interlaced with a plurality of scanning lines 46b, each scanning line 46a and 46b being formed on the bottom substrate 42. Moreover, the liquid crystal display 40 includes a plurality of data lines 48R installed on the bottom substrate 42 for transmitting red image signals, a plurality of data lines 48G positioned on the bottom substrate 42 for transmitting green image signals and a plurality of data lines 48B positioned on the bottom substrate for transmitting blue image signals. On the other hand, the top substrate is a color filter for displaying the color image of liquid crystal display 40.

As shown in FIG. 4, the bottom substrate includes at least one scanning line driving IC mounting area 52 for installing a scanning driving IC (not bounded on the bottom substrate 42 yet). As shown in FIG. 5, the data line driving IC mounting areas 52 include a plurality of bounding pads 64 and at least two standard align marks 66, and the scanning line driving IC mounting area 50 includes a plurality of bounding pads 68 and at least two align marks 70 as shown in FIG. 6.

Furthermore, as shown in FIG. 4 and FIG. 5, the liquid crystal display 40 includes another shorting bar 54a positioned on the bottom substrate 42 and connected to all of the data lines 48R, a shorting bar 54b positioned on the bottom substrate 42 and connected to all of the data lines 48G, and a shorting bar 54c positioned on the bottom substrate 42 and connected to all of the data lines 48B. Moreover, as shown in FIG. 4, the liquid crystal display includes a plurality of test pads 56a, 56b and 56c positioned on the bottom substrate 42, and one end of each of the shorting bars 54a, 54b and 54c is respectively connected to the test pads 56a, 56b and 56c, and the other ends of the shorting bars 54a, 54b and 54c are electrically connected to a flexible printed circuit 58. The flexible printed circuit 58 is shown as a dotted line since it has not been positioned on the bottom substrate. However, FIG. 4 dose not limit the location of the flexible printed circuit 58. The flexible printed circuit 58 can connect to the shorting bars 54a, 54b and 54c at the area A, area B and area C as required. Furthermore, as shown in FIG. 4 and FIG. 6, the liquid crystal display 40 includes another shorting bar 60a installed on the bottom substrate 42 and connected to all of the scanning lines 46a, and shorting bar 60b positioned on the bottom substrate 42 and connected to all of the scanning lines 46b, and one end of each shorting bar 60a and 60b is connected to the test pads 62a and 62b.

What deserves to be mentioned is that each shorting bar 54a, 54b, 54c, 60a and 60b is for carrying out a cell test to inspect whether liquid crystal display 40 contains any unusual phenomenon. The following is a description of this test method. As shown in FIG. 4, firstly, a test equipment (ex: probe) inputs a test signal $S_1$ to the test pads 62a and 62b, and the test signal $S_1$ will pass through each shorting bar 60a and 60b to turn on the gates on each scanning line 46a and 46b. In the meantime, the test equipment inputs a test signal $S_2$ to the test pad 56a, the signal $S_2$ will pass through the shorting bar 54a to each data line 48R to make each red dot pixel on the data line 48R display red color, and the operator checks whether any unusual red defect exists (ex: dark point or mula). After each red dot pixel of the LCD 40 is checked, the test equipment stops outputting signal $S_2$ to the test pad 56a and outputs a signal $S_3$ to the test pad 56b, the test signal $S_3$ will pass through the shorting bar 54b to each data line 48B to make each green dot pixel on the data line 48B display green color, and thereafter the operators can inspect whether any unusual green defect exists. After each green pixel is checked, the test equipment stops outputting test signal $S_3$ to the test pad 56b and outputs a signal $S_4$ to the test pad 56c to make each blue pixel on the data line 48B display blue color, and thereafter the operator inspects each blue pixel to make sure if any unusual defect exists. It should be understood that the aforementioned test order is an illustration, in other words, the test order between red dot pixels, blue dot pixels, and green dot pixels can be adjusted according to each testing situation.

In addition, as shown in FIG. 4, this cell test invention includes the following test steps. First of all, the test equipment outputs a signal $S_1$ to test pads 62a and 62b. The test signal $S_1$ will pass through the shorting bars 60a and 60b to turn on the gates on each scanning line 46a and 46b. After that, the test equipment inputs test signals $S_2$, $S_3$ and $S_4$ to the test pads 54a, 54b and 54c simultaneously, and the test signals $S_2$, $S_3$ and $S_4$ will separately pass through the shorting bars 54a, 54b and 54c to the data lines 48R, 48G and 48B to make the red, green and blue dot pixels display different colors. However, due to the color filter, the liquid crystal display panel 40 displays a black image, and the operator checks the image of liquid crystal display 40. Afterward, the test equipment stops outputting test signal $S_1$ to the test pad 62b to make the liquid crystal display 40 reveal a gray image, meanwhile the operator rechecks the image of liquid crystal display 40. Finally, the test equipment stops outputting the test signal to the test pad 62a to make the liquid crystal display 40 display a white image and the operator checks the image of the liquid crystal display 40.

What deserves to be mentioned is that the data lines 48R, the data lines 48G, and the data line 48G in the invention connect to different shorting bars. Hence the operator can individually inspect each revealed color image of red dot pixels, green dot pixels and blue dot pixels. On the other hand, the invention connects the scanning lines 46a and the scanning lines 46b to different shorting bars. Therefore it can be directed to the individual cell test of black, gray and white images and the operator can collect the more comprehensive defect information for analysis.

As shown in FIG. 5, when the cell test is completed, a cutting process is performed. The cutting process uses the align mark 66 to level the position and a laser to cut off the connection between each shorting bar and each data lines along the dotted line 72. Identically, as shown in FIG. 6, the cutting process uses the align mark 70 to level the position and a laser to cut off the connection between the shorting bar and each scanning line.

When each scanning line/data line connection is cut off, a chip-on-glass (COG) package technique is used to bound each data line driving IC on the data line driving IC mounting area 52, i.e. each data line driving IC is bounded to each bounding pad 64 in FIG. 5. Thereafter the aforementioned scanning line driving ICs are installed on the scanning line driving IC mounting area 50, and each scanning line driving IC is bounded on the each bounding pad 68 by COG as shown in FIG. 6, wherein each scanning driving IC is for outputting clock signals to each scanning line 46a and 46b, each data driving IC is for outputting image information signals to each data line 48R, 48G and 48B.

What deserves to be mentioned is after each data line driving IC is bounded on the data line driving IC mounting areas 52, the shorting bars 54a, 54b and 54c are used to connect the data line driving ICs. Therefore the signals from the flexible printed circuit 58 can pass through the shorting bars to each individual data line driving IC to make each data line driving IC output image information to each data line 48R, 48G and 48B. In other words, in this invention, the shorting bars 54a, 54b and 54c are for performing cell tests in advance. After the cell test, the shorting bars 54a, 54b and 54c are used to connect to the data line driving IC. Therefore, the present invention shorting bars 54a, 54b and 54c can be used to perform the cell test and connect to the data line driving ICs so that it can reduce the number of conductive wires and reach the objective of saving space. Moreover, when the data line driving IC operation is mistaken, each test pad 56a, 56b and 56c can be used to test the data line driving ICs to find the bugs. In other words, the test pads in the present invention 56a, 56b and 56c are used to perform crystal display cell tests in advance. When the test is completed, the test pads 56a, 56b and 56c can be used to test each data driving IC. Therefore, the invention can not only reduce to number of test pads but can also solve the aforementioned problem in which there is not enough space for setting test pads needed for the shorting bars.

Figure 7:
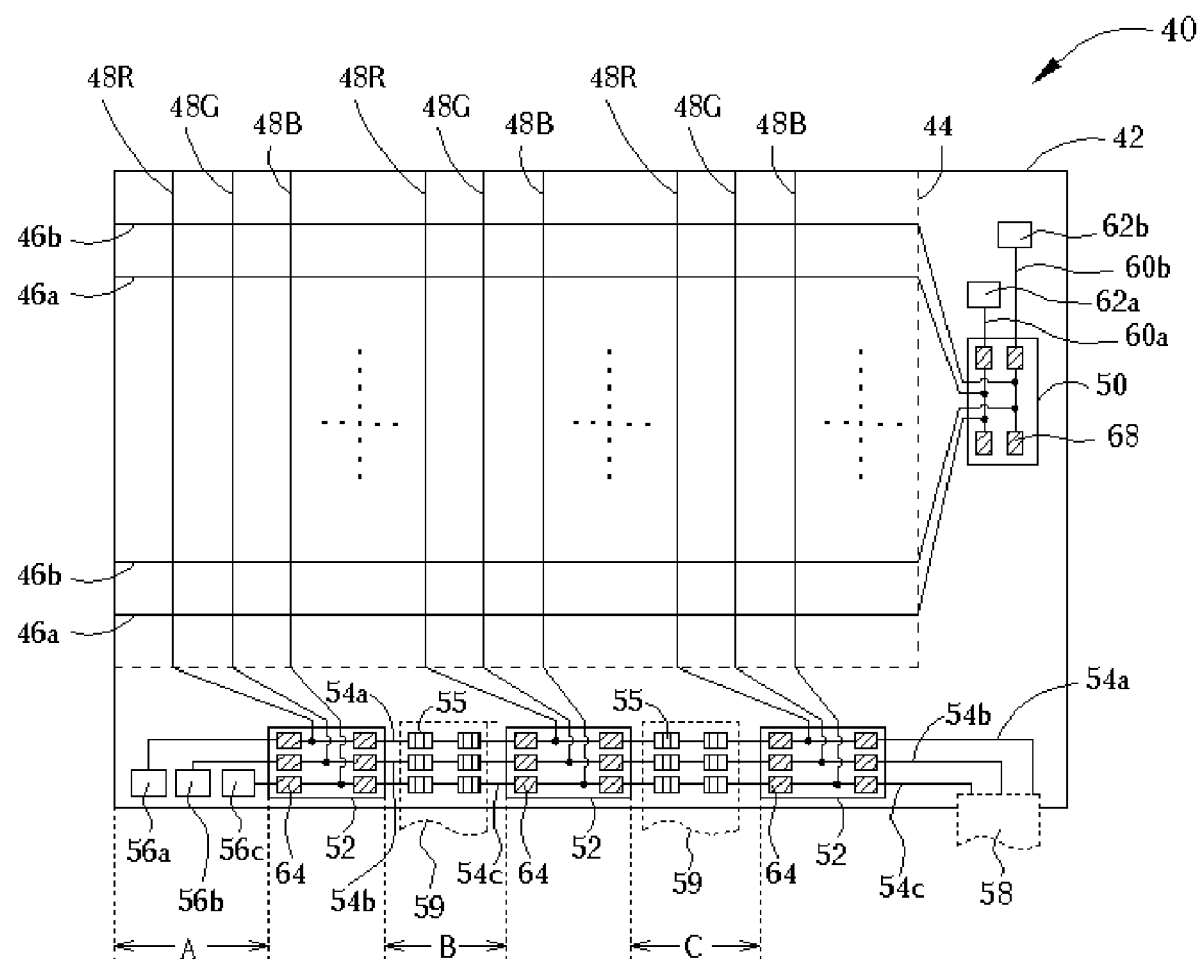
FIG. 7 is a schematic diagram of the second embodiment of the present invention liquid crystal display.

Please refer to FIG. 7. FIG. 7 is one of the schematic diagrams of the second embodiment. For convenient description, the same marks are used for the same devices. As shown in FIG. 7, the LCD 40 includes another plurality of power bonding pads 55 positioned between two neighboring data line driving IC mounting areas 52 and connected to the shorting bars 54a, 54b and 54c. Generally, when the scale of the LCD becomes larger and larger, as result of the equivalent resistance of each shorting bars 54a, 54b and 54c, the signal strength outputted from flexible printed circuit 58 will decrease along the shorting bars 54a, 54b and 54c. In order to reduce this phenomenon, the second embodiment of the invention attaches other flexible printed circuits 59 to the power bonding pads at the area B and area C, and the flexible printed circuits 59 can output control signals to each corresponding data line driving IC to strengthen the signal from the flexible printed circuit 58.

In addition, the described LCD 40 comprises a scanning line driving IC mounting area 50. However, it should be understood that the invention is not limited, and the number of scanning line driving ICs can be changed according to the realistic product requirements. The described data line driving IC mounting area 52 relative design can also be applied to the scanning line driving IC mounting area 50, and the number and the position of the described data line driving IC mounting areas, scanning line driving IC mounting areas, shorting bars, bounding pads and test pads can be changed according to the realistic product requirement not limited by FIG. 4 and FIG. 7.

Compared with the prior art, accordingly, the data line 48R, 48G, and 48B in the present invention are individually connected to different shorting bars, the invention can inspect red dot pixels, green dot pixels and blue dot pixels separately to gain the more complete defect information. Furthermore, the preferred shorting bars 54a, 54b, and 54c are used to perform cell tests and connect the data line (or power line) driving ICs so that the invention can reduce the number of conductive wires to reach the objective of saving place. On the other hand, the test pads 56a, 56b and 56c can be used to perform both the cell test and the driving IC test. It can not only reduce the number of test pads but also solve the problem of lack of space for setting test pads of shorting bars.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A liquid crystal display panel with a test cell structure comprising:
    a substrate;
    a plurality of first driving IC mounting areas formed on the surface of the substrate for mounting a first driving IC separately;
    a plurality of first conductive wires in parallel;
    a plurality of second conductive wires in parallel with and interlaced with the first conductive wires on the substrate for receiving the signals from the first driving ICs;
    a first shorting bar connected to the first conductive wires and passing through all of the first driving IC mounting areas;
    a second shorting bar connected to the second conductive wires and passing through all of the first driving IC mounting areas; and
    a plurality of first bounding pads disposed on the substrate for electrically connecting a first flexible printed circuit and the first and the second shorting bars;
    wherein after the liquid crystal cell test is completed, the first and the second shorting bars are connected to the first driving ICs in series.

2. The liquid crystal display panel of claim 1 wherein the surface of the substrate contains at least one second driving IC mounting area that is used for mounting one second driving IC, the test structure further comprising:
    a plurality of third conductive wires perpendicular to the first and second conductive wires located on the substrate for receiving the signals from the second driving IC; and
    a third shorting bar connected to the third conductive wires and located at the second driving IC mounting area.

3. The liquid crystal display panel of claim 2 wherein the surface of the substrate comprises a plurality of testing pads connected to the one end of the first, the second, and the third shorting bars, which is for inputting the detected signal to the first, the second, and the third shorting bars to perform a liquid cell test.

4. The liquid crystal display panel of claim 3 wherein the first and the second conductive wires are data lines, the third conductive wires are scanning lines.

5. The liquid crystal display panel of claim 4 further comprising:
- a plurality of fourth conductive wires parallel to the third wires used as a scanning line and for receiving the signal from the second driving IC; and
- a fourth shorting bar connected to the fourth conductive wires installed at the second driving IC mounting area.

6. The liquid crystal display panel of claim 5 wherein the substrate comprises a plurality of the second driving IC mounting areas, and the third and the fourth shorting bars pass through the second driving IC mounting areas, and when the liquid crystal cell test is completed, the third and the fourth shorting bars are used to connect to the second driving IC in series.

7. The liquid crystal display panel of claim 6 further comprising:
- a plurality of fifth conductive wires parallel to the first and the second conductive wires used as data lines and for receiving the signal from the first driving IC, each first conductive wire transmitting a red image signal, each second conductive wire transmitting a green image signal, and each fifth conductive wire transmitting a blue image signal; and
- a fifth shorting bar connected to the fifth conductive wire and located at the first driving mounting area, and when the liquid cell test is completed, the fifth shorting bar is used to connect the first driving IC in series.

8. The liquid crystal display panel of claim 3 wherein each first and second conductive wire are scanning lines and every third conductive wire is a data line, and when the cell test is completed, the first and the second shorting bars are used to connect the first driving ICs in series.

9. The liquid crystal display panel of claim 8 wherein the surface of the substrate includes a plurality of the second driving IC mounting areas, and all of the third shorting bars pass through the second driving IC mounting areas, and when the liquid crystal cell test is completed, the third shorting bar is used to connect the second driving ICs in series.

10. The liquid crystal display panel of claim 2 wherein the surface of the liquid crystal display further includes a plurality of the second driving IC mounting areas for mounting a plurality of second driving ICs, and the liquid crystal display comprises a plurality of second bounding pads located on the third shorting bars between two neighboring second driving IC mounting areas for electrically connecting a second flexible printed circuit to the third shorting bar between the two neighboring second driving IC mounting areas, wherein the second flexible printed circuit is for inputting a signal to the second driving ICs.

11. The liquid crystal display panel of claim 1 wherein the first bounding pads are located on the first and the second shorting bars between two neighboring first driving IC mounting areas, and the first flexible printed circuit electrically connected to the first bounding pads inputs signals to the first driving ICs through the first and second shorting bars.

12. The liquid crystal display panel of claim 1 wherein the first driving ICs are disposed on the first shorting bar and the second shorting bar, and the first driving ICs are electrically connected to the first shorting bar and the second shorting bar after the liquid crystal cell test.

13. The liquid crystal display panel of claim 12 wherein the liquid crystal display panel comprises a plurality of third bounding pads disposed on the first and the second shorting bars and in the first driving IC mounting areas, and the bounding pads electrically connect the first and the second shorting bars to the first driving ICs directly.

* * * * *